US010112551B2

(12) United States Patent
Manes

(10) Patent No.: US 10,112,551 B2
(45) Date of Patent: Oct. 30, 2018

(54) QUICK RELEASE STEERING WHEEL KNOB WITH BLUETOOTH AUDIO TRANSDUCER

(71) Applicant: Bruce Lee Manes, Wimauma, FL (US)

(72) Inventor: Bruce Lee Manes, Wimauma, FL (US)

( * ) Notice: Subject to any disclaimer, the term of this patent is extended or adjusted under 35 U.S.C. 154(b) by 0 days.

(21) Appl. No.: 15/847,763

(22) Filed: Dec. 19, 2017

(65) Prior Publication Data

US 2018/0170276 A1 Jun. 21, 2018

Related U.S. Application Data

(60) Provisional application No. 62/435,954, filed on Dec. 19, 2016.

(51) Int. Cl.
*B60R 11/02* (2006.01)
*B62D 1/04* (2006.01)
*H04R 1/02* (2006.01)
*H04R 3/00* (2006.01)
*B60R 11/00* (2006.01)

(52) U.S. Cl.
CPC .......... *B60R 11/0217* (2013.01); *B62D 1/043* (2013.01); *H04R 1/026* (2013.01); *H04R 3/00* (2013.01); *B60R 2011/001* (2013.01); *B60R 2011/0059* (2013.01); *B60R 2011/0078* (2013.01); *H04R 2420/07* (2013.01); *H04R 2499/13* (2013.01)

(58) Field of Classification Search
CPC .......... B60R 11/0217; B60R 2011/001; B60R 2011/0059; B60R 2011/0078; B62D 1/043; B62D 1/04; H04R 1/026; H04R 3/00; H04R 2420/07; H04R 2499/13; F16B 21/09; Y10T 74/2084; Y10T 74/20864; G05G 1/10
See application file for complete search history.

(56) References Cited

U.S. PATENT DOCUMENTS

| | | | | |
|---|---|---|---|---|
| 5,289,736 A | * | 3/1994 | Fujimori | B62D 1/043 74/552 |
| 6,108,871 A | * | 8/2000 | Weakland | B62D 1/043 16/422 |
| 2016/0036953 A1 | * | 2/2016 | Lee | H04M 1/576 455/426.1 |
| 2017/0118556 A1 | * | 4/2017 | Macours | H04R 3/005 |
| 2017/0135635 A1 | * | 5/2017 | Bostick | A61B 5/681 |

FOREIGN PATENT DOCUMENTS

JP 2017007567 A * 1/2017

* cited by examiner

*Primary Examiner* — Mark Fischer
(74) *Attorney, Agent, or Firm* — Kenneth L. Green; Averill & Green

(57) ABSTRACT

An bluetooth audio steering wheel knob is quickly attachable and detachable without tools and includes a bluetooth circuit and at least one audio transducer. The bluetooth audio steering wheel knob includes a housing having a shaft inserted into a bracket mounted to a steering wheel. The shaft may include a spring loaded ball detent which engages a recess ring inside a shaft passage in the bracket, allowing the bluetooth audio steering wheel knob to be detached by a firm tug, or a mounting block may include a spring loaded lock which engages a stud extending down from a housing base. The batteries, a bluetooth circuit and at least one audio transducer is housed inside the bluetooth audio steering wheel knob and is rechargeable using a plug in charger or separate base.

18 Claims, 15 Drawing Sheets

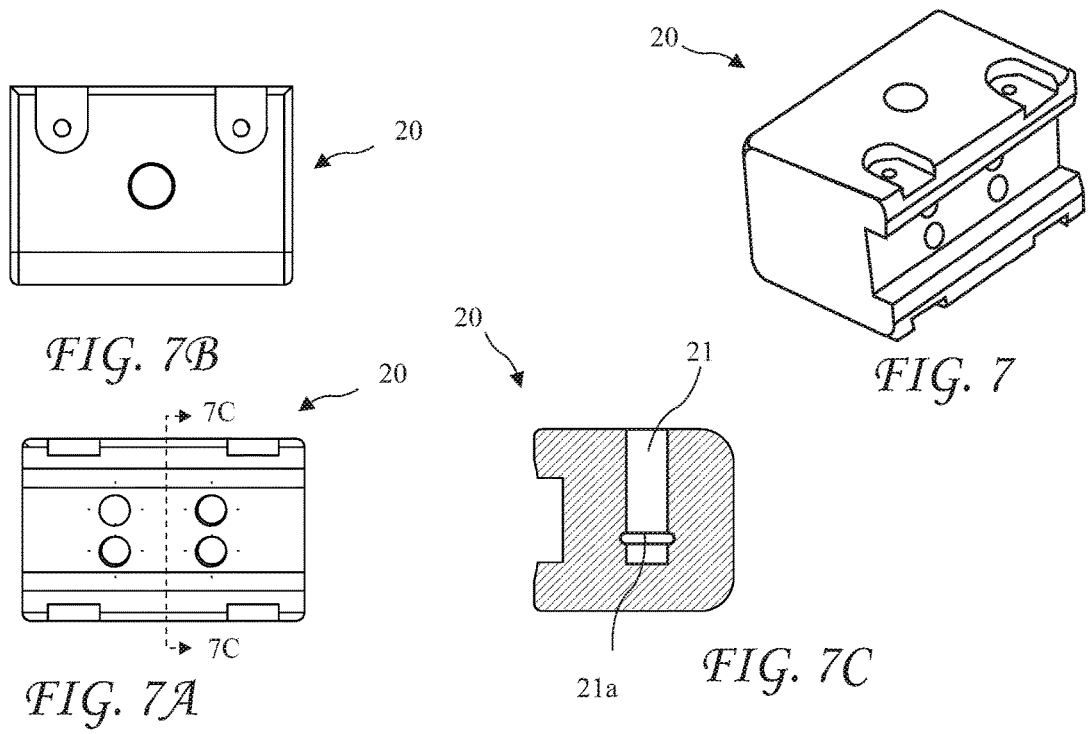
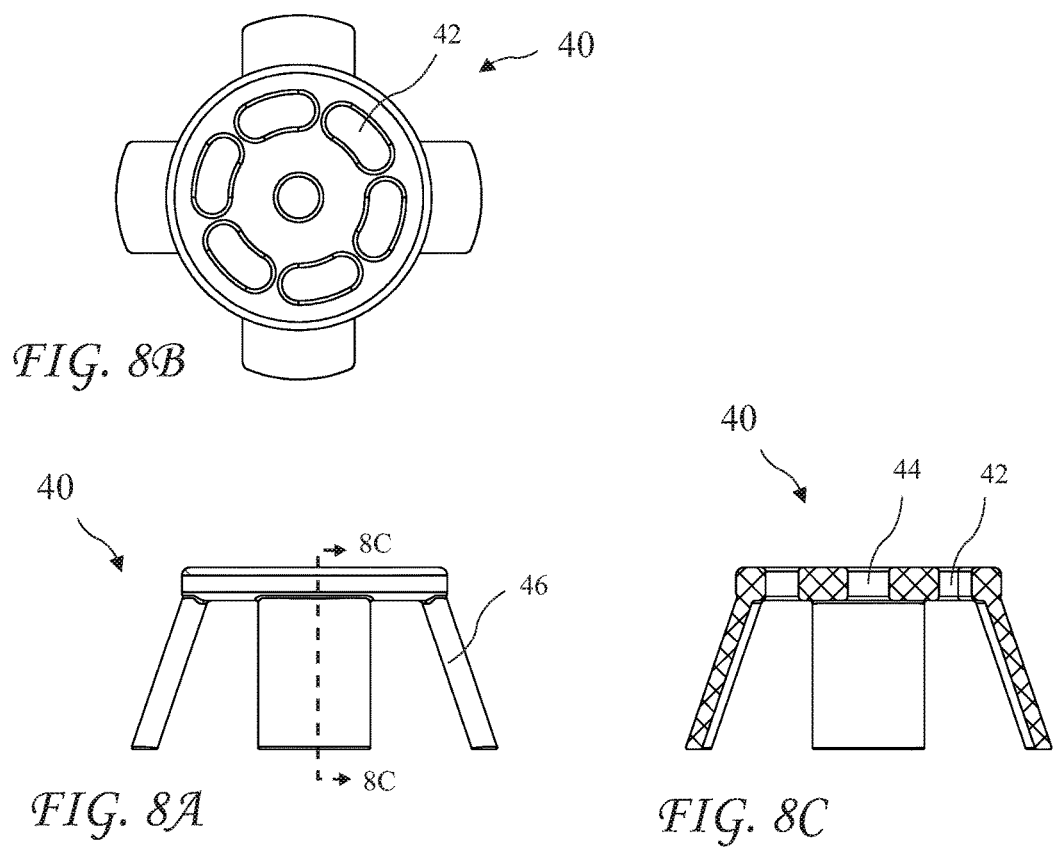

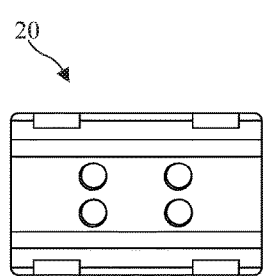
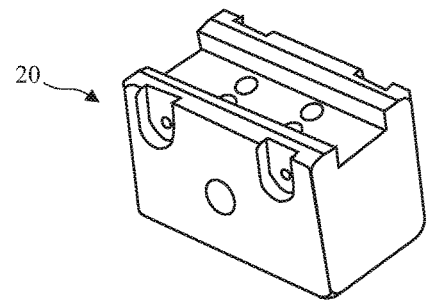
FIG. 15
FIG. 16B
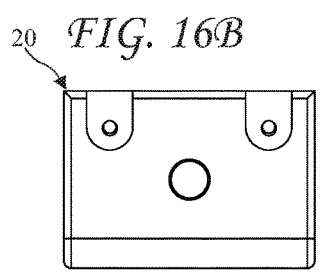
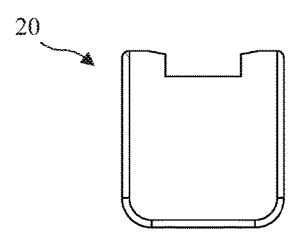
FIG. 16C
FIG. 16A
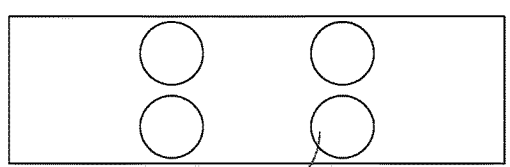
FIG. 18B
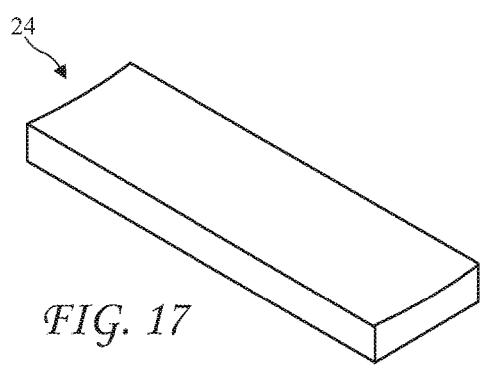
FIG. 17
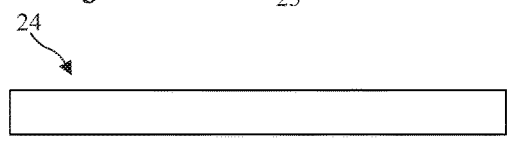
FIG. 18C
FIG. 18A

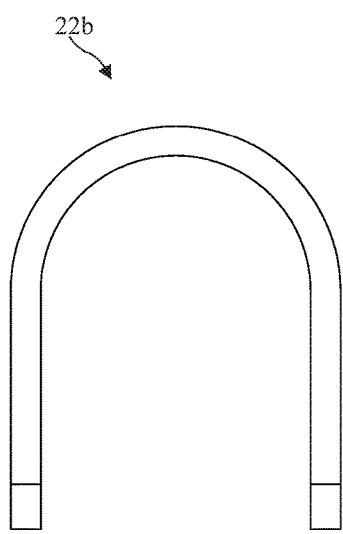
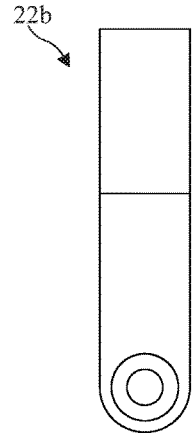
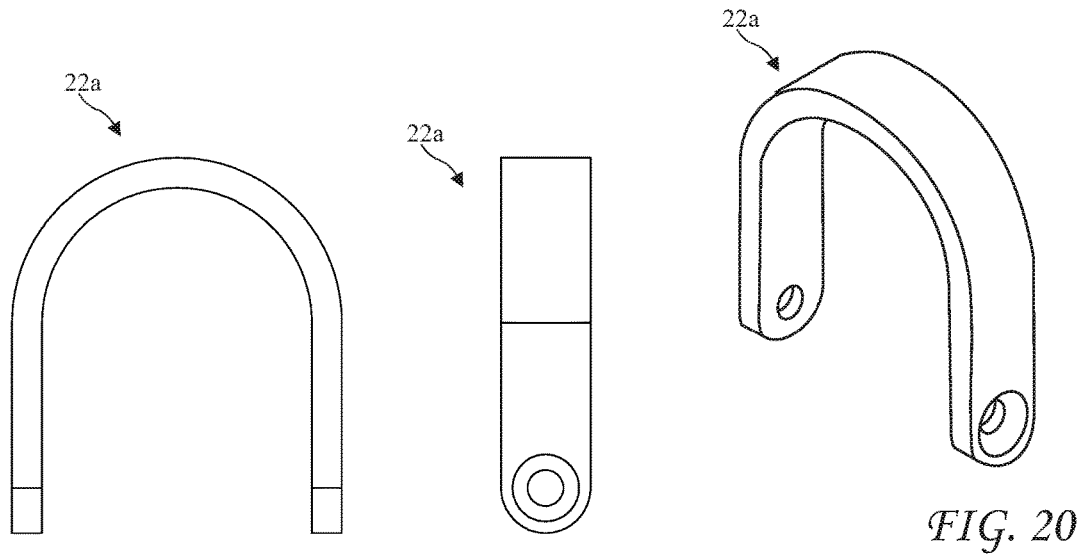
FIG. 21A  FIG. 21B  FIG. 20
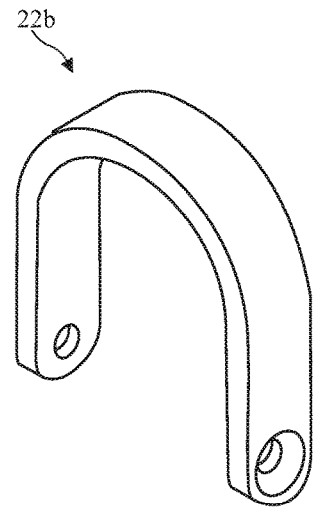
FIG. 23A  FIG. 23B  FIG. 22

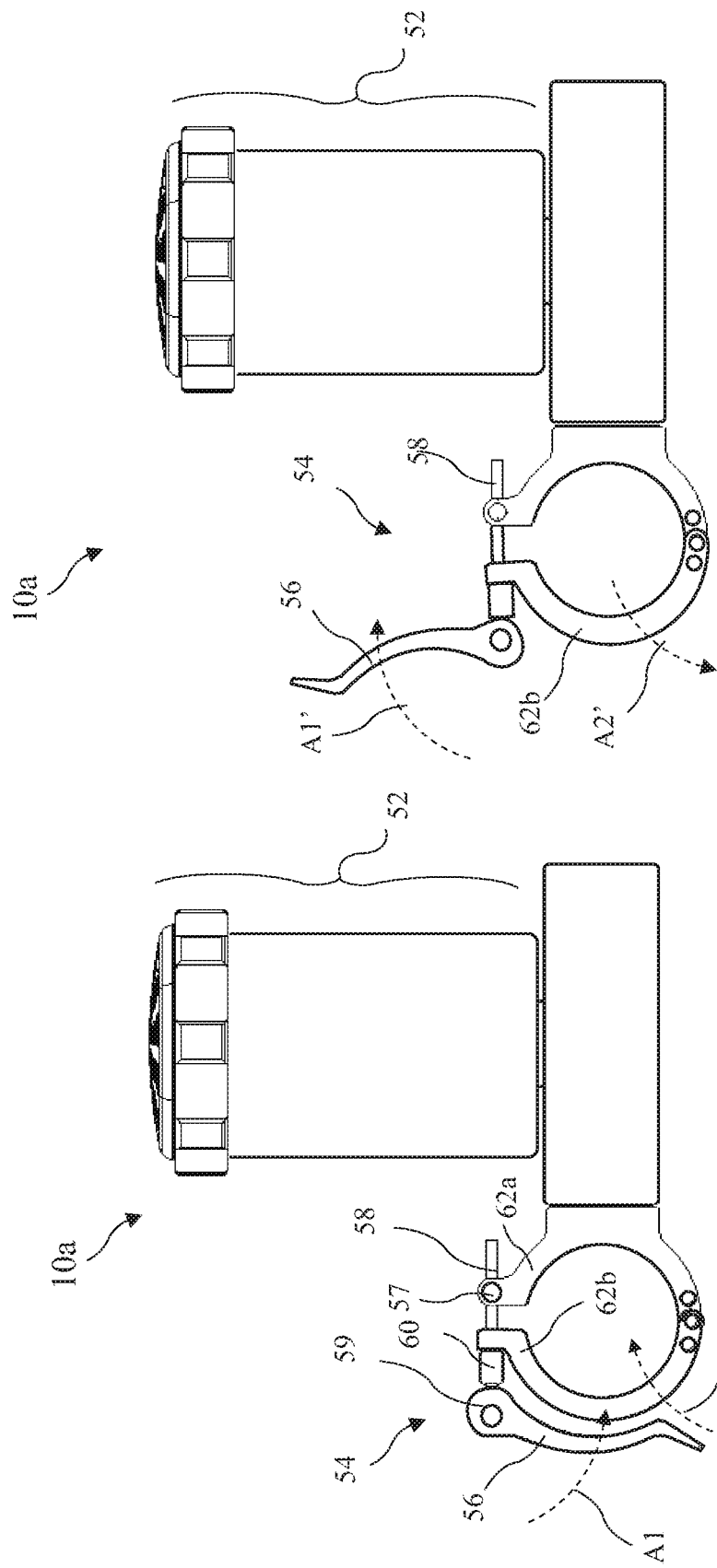

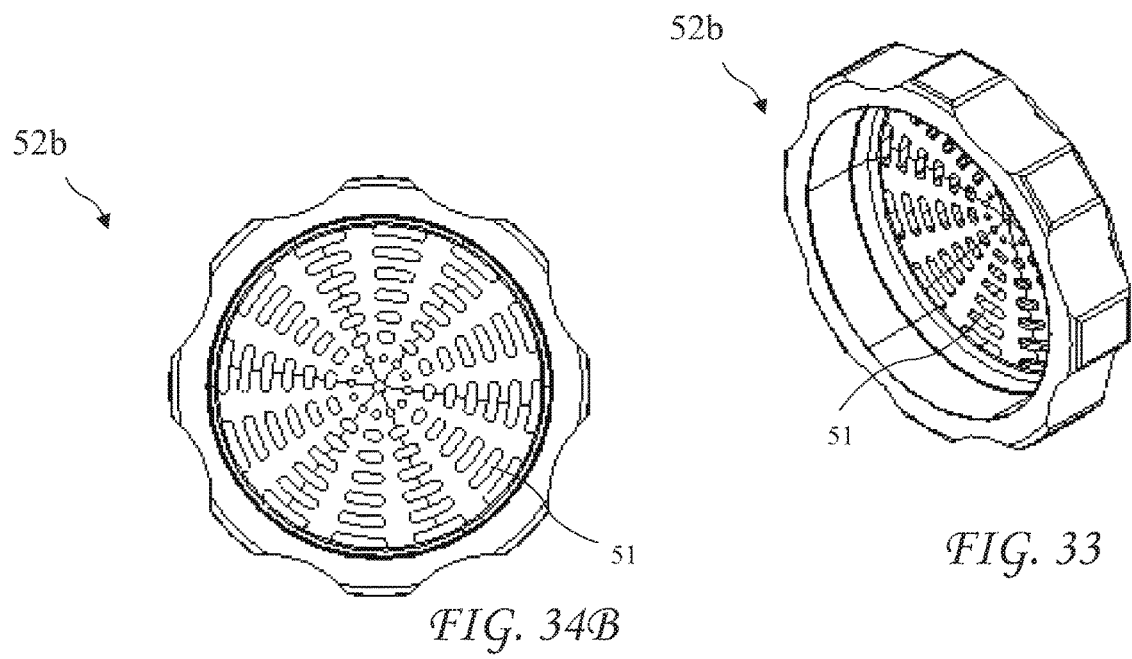
FIG. 33
FIG. 34B
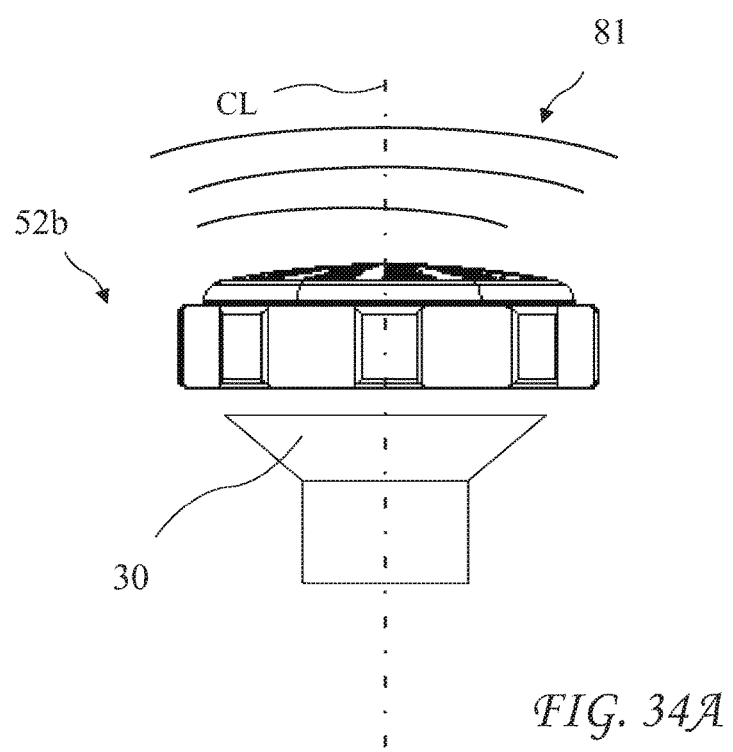
FIG. 34A

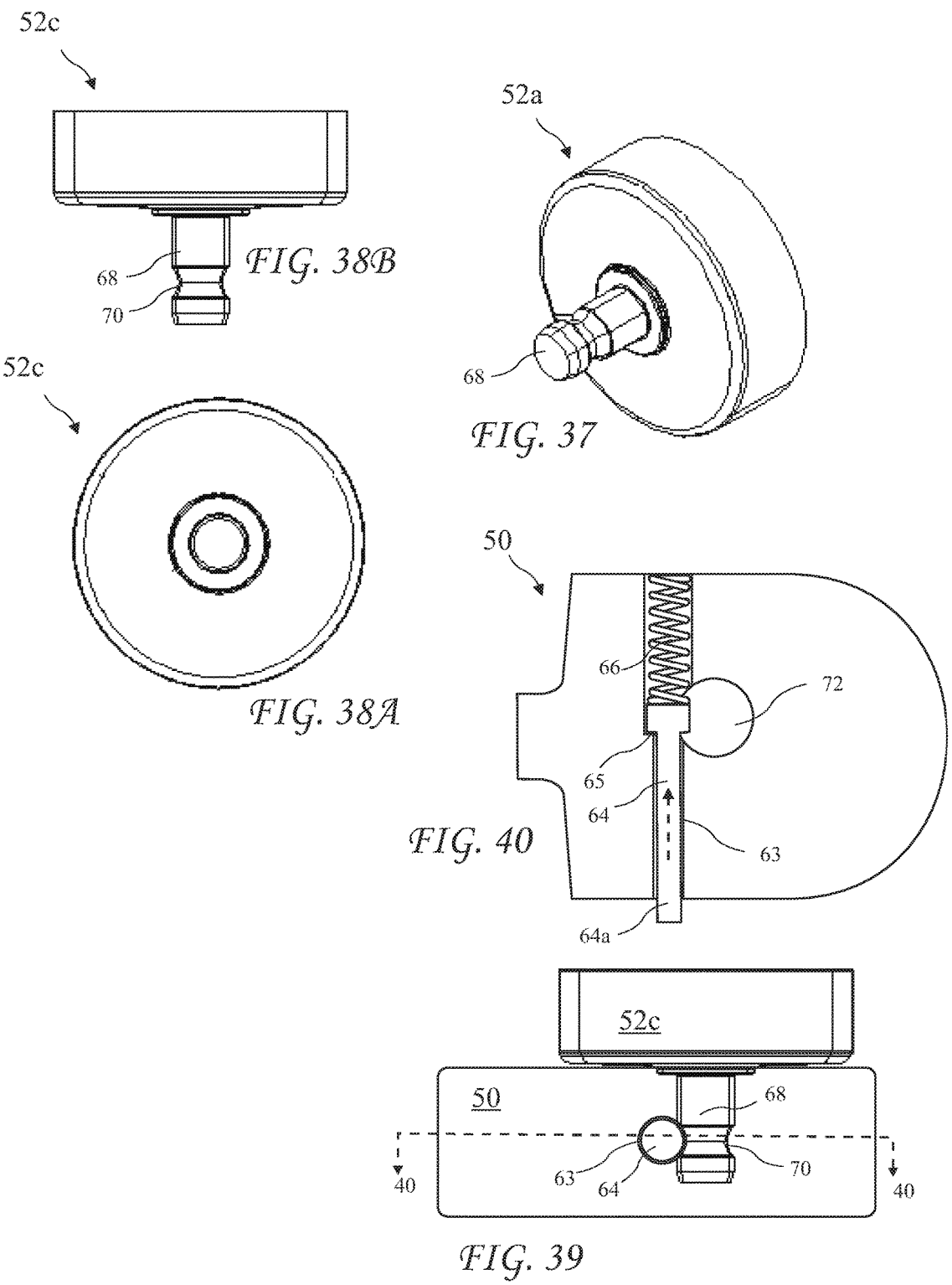

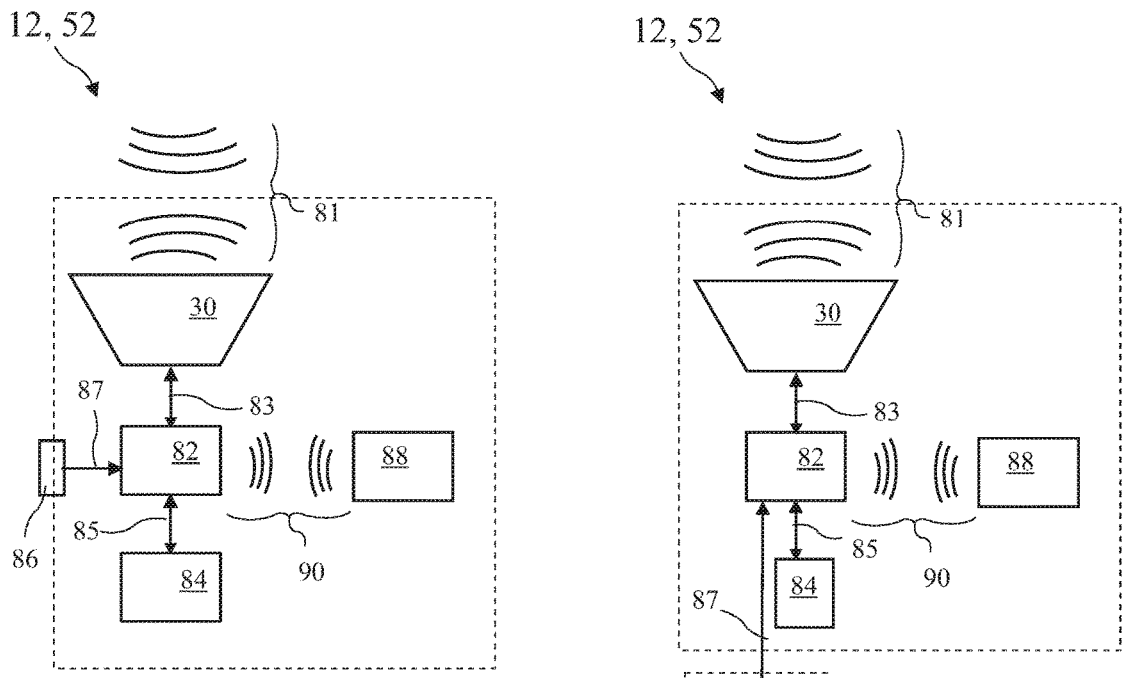
FIG. 41
FIG. 42
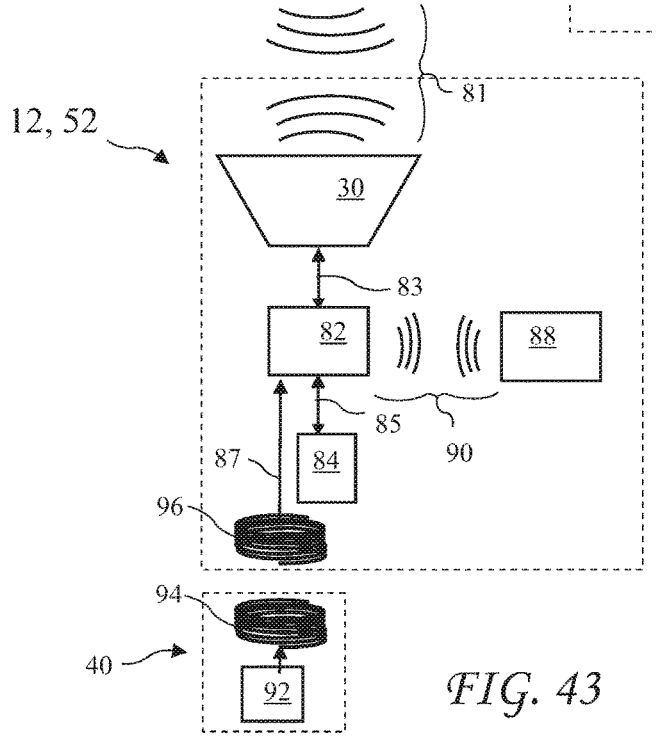
FIG. 43

QUICK RELEASE STEERING WHEEL KNOB WITH BLUETOOTH AUDIO TRANSDUCER

CROSS-REFERENCE TO RELATED APPLICATIONS

The present application claims the priority of U.S. Provisional Patent Application Ser. No. 62/435,954 filed Dec. 19, 2016, which application is incorporated in its entirety herein by reference.

BACKGROUND OF THE INVENTION

The present invention relates to steering wheel knobs and in particular to a quick release BLUETOOTH® wireless communication link audio steering wheel knob.

Drivers, and truck drivers in particular, often desire to attach a steering wheel knob (also known as a brody knob) to a vehicles steering wheel to allow rapid turning of the steering wheel. Such rapid turning is desirable while parking and in particular while backing into a narrow area. However, once the need for the steering wheel knob has passed, the knob may become obstructive. Thus a need is present for an easily removable steering wheel knob.

Further, drivers often carry BLUETOOTH® wireless communication link devices containing audio material. Wireless battery powered BLUETOOTH® wireless communication link speakers are often used with these devices. Because wireless speakers may discharge the batteries quickly, there is a need for a wireless speaker positioned close to the driver to allow low volume levels to extend battery life.

BRIEF SUMMARY OF THE INVENTION

The present invention addresses the above and other needs by providing a BLUETOOTH® wireless communication link audio steering wheel knob which is quickly attachable and detachable without tools and includes a BLUETOOTH® wireless communication link circuit and at least one audio transducer. The BLUETOOTH® wireless communication link audio steering wheel knob includes a housing having a shaft inserted into a bracket mounted to a steering wheel. The shaft may include a spring loaded ball detent which engages a recess ring inside a shaft passage in the bracket, allowing the BLUETOOTH® wireless communication link audio steering wheel knob to be detached by a firm tug, or a mounting block may include a spring loaded lock which engages a stud extending down from a housing base. The batteries, a BLUETOOTH® wireless communication link circuit and at least one audio transducer is housed inside the BLUETOOTH® wireless communication link audio steering wheel knob and is rechargeable using a plug in charger or separate base.

In accordance with one aspect of the invention, there is provided a BLUETOOTH® wireless communication link audio steering wheel knob incorporation a battery powered BLUETOOTH® wireless communication link circuit and at least one audio transducer. Incorporating the at least one audio transducer inside the BLUETOOTH® wireless communication link audio steering wheel knob provides a synergistic result of easily positioning the at least one audio transducer close to the driver to allow low volume levels and long battery life.

In accordance with another aspect of the invention, there is provided a quick releasable BLUETOOTH® wireless communication link audio steering wheel knob incorporation a battery powered BLUETOOTH® wireless communication link circuit and audio transducer. The quick release allows a driver to switch the BLUETOOTH® wireless communication link audio steering wheel knob between vehicles or to carry the BLUETOOTH® wireless communication link audio steering wheel knob into a hotel room, etc.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 7 is a top and side view of a mounting block according to the present invention.

FIG. 7A is a rear view of the housing block according to the present invention.

FIG. 7B is a top view of the housing block according to the present invention.

FIG. 7C is a cross-sectional view of the housing block according to the present invention taken along line 7C-7C of FIG. 7A.

FIG. 8A shows a side view of a charging base of the BLUETOOTH® wireless communication link audio steering wheel knob according to the present invention.

FIG. 8B shows a top view of the charging base of the BLUETOOTH® wireless communication link audio steering wheel knob according to the present invention.

FIG. 8C shows a cross-sectional view of the charging base of the BLUETOOTH® wireless communication link audio steering wheel knob according to the present invention taken along line 8-8 of FIG. 7A.

FIG. 15 shows a mount of the BLUETOOTH® wireless communication link audio steering wheel knob according to the present invention.

FIG. 16A shows a side view of the mount of the BLUETOOTH® wireless communication link audio steering wheel knob according to the present invention.

FIG. 16B shows a top view of the mount of the BLUETOOTH® wireless communication link audio steering wheel knob according to the present invention.

FIG. 16C shows an end view of the mount of the BLUETOOTH® wireless communication link audio steering wheel knob according to the present invention.

FIG. 17 shows a top and side view of a mount plate of the BLUETOOTH® wireless communication link audio steering wheel knob according to the present invention.

FIG. 18A shows a side view of the mount plate of the BLUETOOTH® wireless communication link audio steering wheel knob according to the present invention.

FIG. 18B shows a top view of the mount plate of the BLUETOOTH® wireless communication link audio steering wheel knob according to the present invention.

FIG. 18C shows an end view of the mount plate of the BLUETOOTH® wireless communication link audio steering wheel knob according to the present invention.

FIG. 20 shows a top and side view of a first strap of the BLUETOOTH® wireless communication link audio steering wheel knob according to the present invention.

FIG. 21A shows an end view of the first strap of the BLUETOOTH® wireless communication link audio steering wheel knob according to the present invention.

FIG. 21B shows a side view of the first strap of the BLUETOOTH® wireless communication link audio steering wheel knob according to the present invention.

FIG. 22 shows a top and side view of a second strap of the BLUETOOTH® wireless communication link audio steering wheel knob according to the present invention.

FIG. 23A shows an end view of the second strap of the BLUETOOTH® wireless communication link audio steering wheel knob according to the present invention.

FIG. 23B shows a side view of the second strap of the BLUETOOTH® wireless communication link audio steering wheel knob according to the present invention.

FIG. 32A is a side view of the second BLUETOOTH® wireless communication link audio steering wheel knob according to the present invention with a clamp lever closed.

FIG. 32B is a side view of the second BLUETOOTH® wireless communication link audio steering wheel knob according to the present invention with a clamp lever open.

FIG. 33 is a bottom and side view of a housing lid of the second BLUETOOTH® wireless communication link audio steering wheel knob according to the present invention.

FIG. 34A is a side view of the housing lid of the second BLUETOOTH® wireless communication link audio steering wheel knob according to the present invention.

FIG. 34B is a top view of the housing lid of the second BLUETOOTH® wireless communication link audio steering wheel knob according to the present invention.

FIG. 37 is a bottom and side view of a housing base of the second BLUETOOTH® wireless communication link audio steering wheel knob according to the present invention.

FIG. 38A is a side view of the housing base of the second BLUETOOTH® wireless communication link audio steering wheel knob according to the present invention.

FIG. 38B is a top view of the housing base of the second BLUETOOTH® wireless communication link audio steering wheel knob according to the present invention.

FIG. 39 is a cutaway side view of the housing base retained on a mounting block of the second BLUETOOTH® wireless communication link audio steering wheel knob according to the present invention.

Figure 1A:
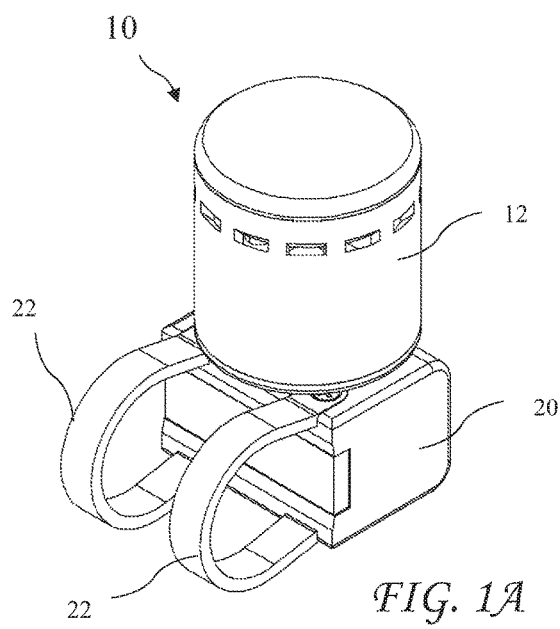
FIG. 1A is a top rear view of an BLUETOOTH® wireless communication link audio steering wheel knob according to the present invention.

FIG. 40 is a cross sectional view of the mounting block of the second BLUETOOTH® wireless communication link audio steering wheel knob according to the present invention taken along line 40-40 of FIG. 39.

FIG. 41 shows a circuit according to the present invention.

FIG. 42 shows a second circuit according to the present invention.

FIG. 43 shows a third circuit according to the present invention

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1B:
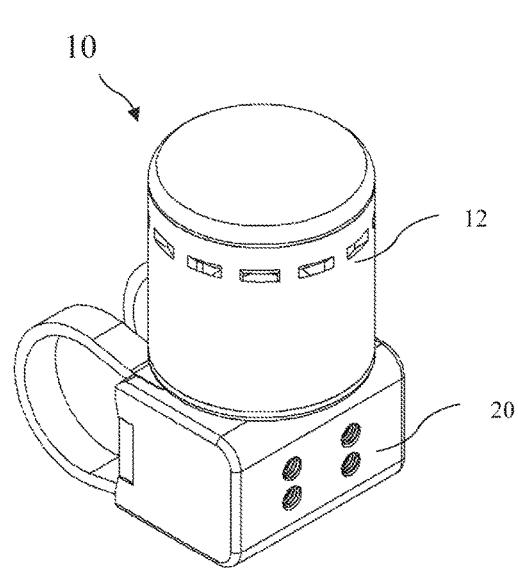
FIG. 1B is a top front view of the BLUETOOTH® wireless communication link audio steering wheel knob according to the present invention.
Figure 1C:
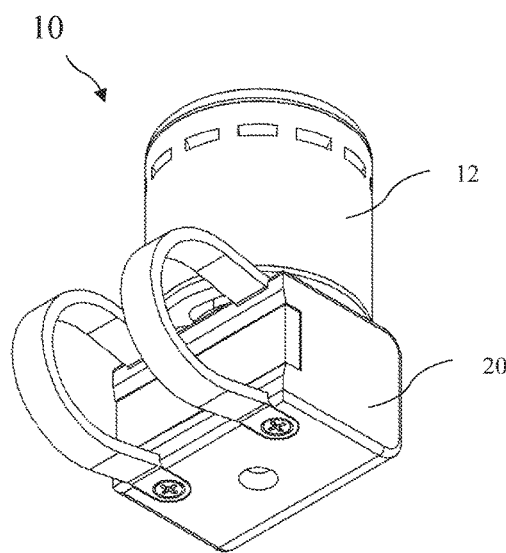
FIG. 1C is a bottom rear view of the BLUETOOTH® wireless communication link audio steering wheel knob according to the present invention.
Figure 1D:
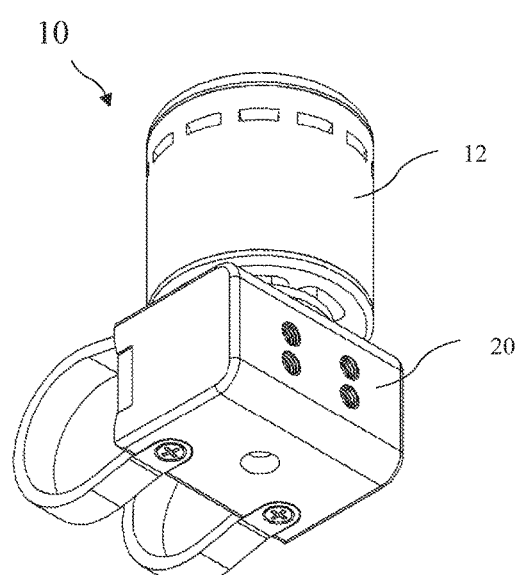
FIG. 1D is a bottom front view of the BLUETOOTH® wireless communication link audio steering wheel knob according to the present invention.

A top rear view of a BLUETOOTH® wireless communication link (hereafter bluetooth) audio steering wheel knob 10 according to the present invention is shown in FIG. 1A, a top front view of the audio steering wheel knob 10 is shown in FIG. 1B, a bottom rear view of the audio steering wheel knob 10 is shown in FIG. 1C, and a bottom front view of the audio steering wheel knob 10 is shown in FIG. 1D. The audio steering wheel knob 10 includes a housing 12 and a mounting block 20. Straps 22 attach the mounting block 20 to a steering wheel.

Figure 2:
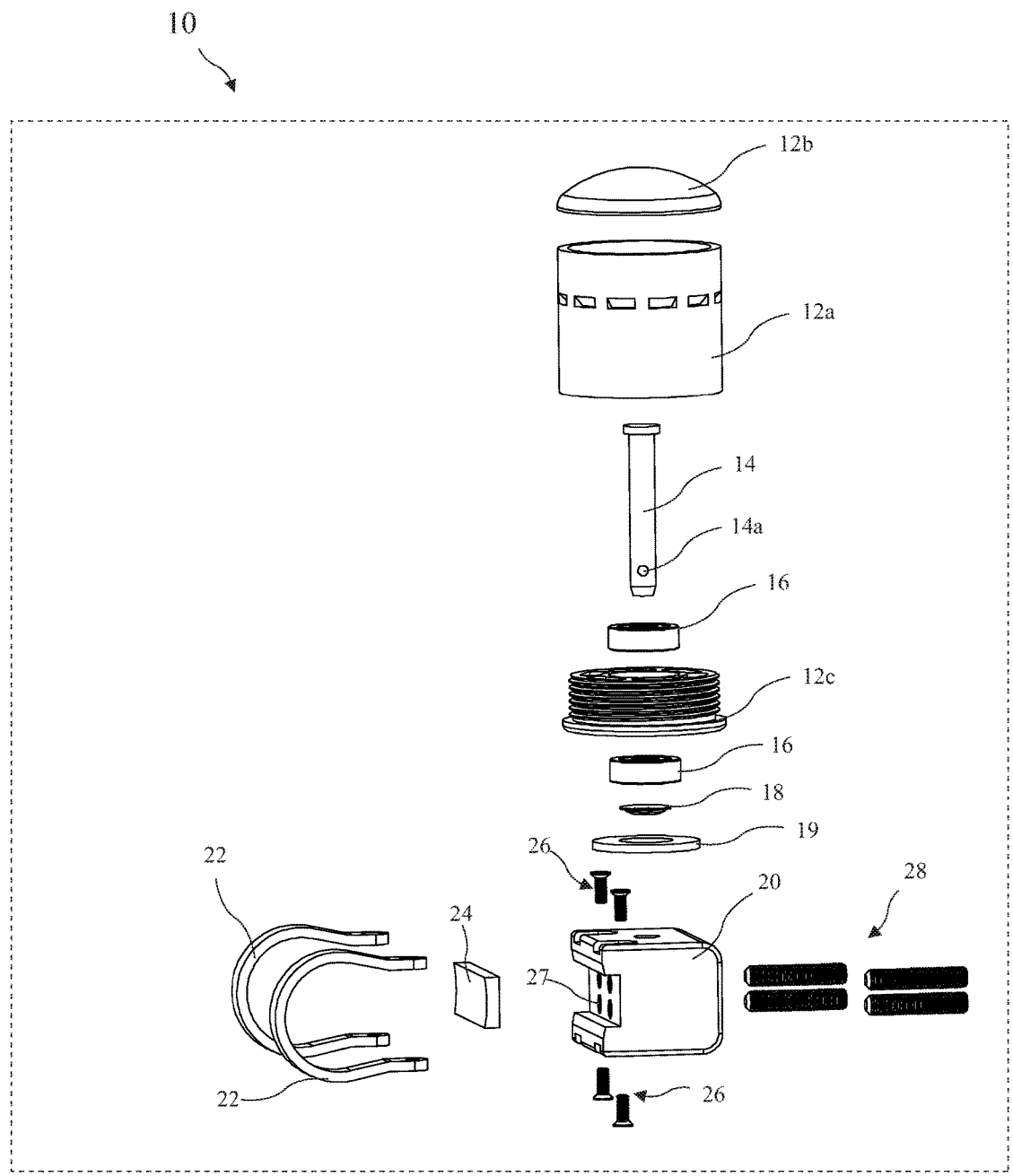
FIG. 2 is an exploded view of the BLUETOOTH® wireless communication link audio steering wheel knob according to the present invention.

An exploded view of the bluetooth audio steering wheel knob 10 is shown in FIG. 2. The housing 12 is formed from a generally cylindrical housing body 12a, a housing top 12b, and a housing bottom 12c. The housing bottom 12c is preferably threadably attached to the housing body 12a. A shaft 14 is attached to the housing bottom 12c through bearings (or bushings) 16 and the housing 12 is free to rotate on the shaft 14. A push nut 18 preferably slides onto the shaft 14 and retains attachment of the shaft 14 and the bearings 16 to the housing bottom 12c.

The shaft 14 includes a retaining ball 14a biased to partially extending out of the shaft 14 for retaining the steering wheel knob housing 12 on the housing block 20. A low friction material, for example nylon, spacer 19 resides on the shaft 14 between the housing bottom 12c and the mounting block 20. The straps 22 are attached to the mounting block 20 by strap screws 26 and a plate 20 including 4 recesses 25 (see FIG. 18B) aligned with threaded passages 27 which receive plate screws 28 to tighten the mounting block 20 against the steering wheel.

Figure 3:
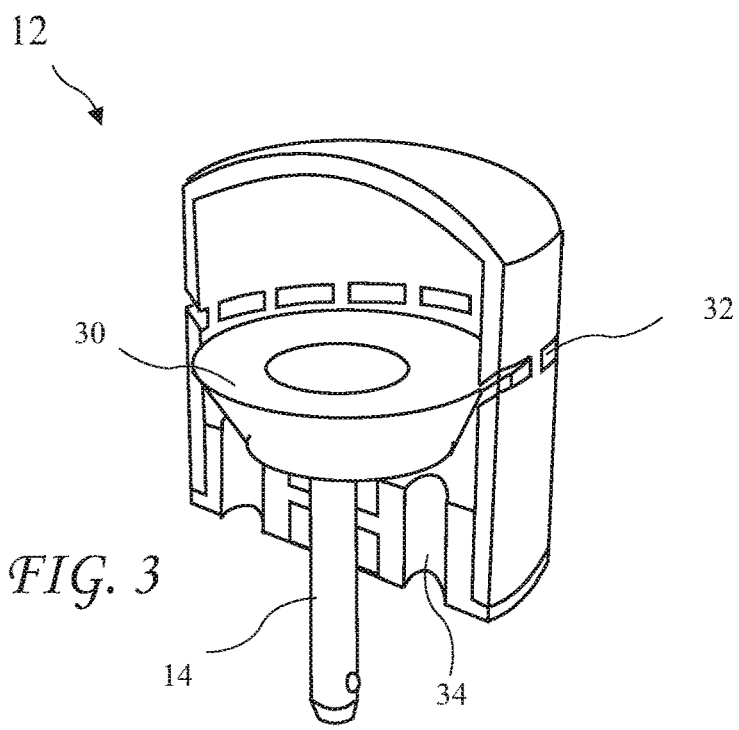
FIG. 3 is a cut-away view of the BLUETOOTH® wireless communication link audio steering wheel knob according to the present invention showing at least one audio transducer inside the BLUETOOTH® wireless communication link audio steering wheel knob.

A cut-away view of the bluetooth audio steering wheel knob 10 showing an audio transducer (or speaker) 30 inside the housing 12 is shown in FIG. 3. The housing body 12a includes sound ports 32 above the audio transducer 30 and the housing bottom 12c includes bottom ports 34 below the audio transducer 30. The audio transducer 30 receives power from a bluetooth circuit (see FIGS. 41-43), but may include any wireless technology circuit. An example of suitable components are 360 Acoustics Little Phoenix model 360mdla-rev1 locking sound assemblies.

Figure 5:
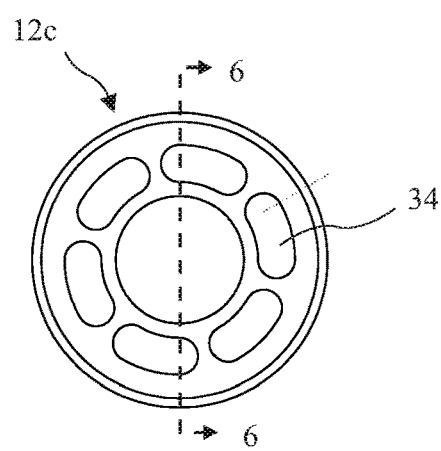
FIG. 5 shows a bottom view of the housing bottom of the BLUETOOTH® wireless communication link audio steering wheel knob according to the present invention.
Figure 4:
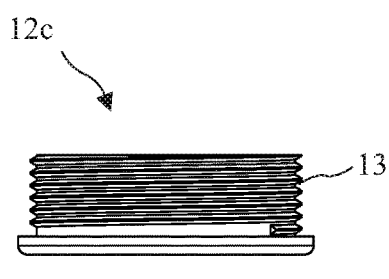
FIG. 4 shows a side view of the housing bottom of the BLUETOOTH® wireless communication link audio steering wheel knob according to the present invention.
Figure 6:
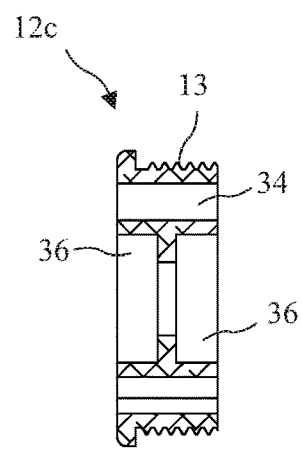
FIG. 6 shows a cross-sectional view of the housing bottom of the BLUETOOTH® wireless communication link audio steering wheel knob according to the present invention taken along line 6-6 of FIG. 5B.

A side view of the housing bottom 12c is shown in FIG. 4, a bottom view of the housing bottom 12c is shown in FIG. 5, and a cross-sectional view of the housing bottom 12c taken along line 6-6 of FIG. 5 is shown in FIG. 6. The housing bottom 12c includes male threads 13 for attachment to the housing body 12a, the bottom ports 34, and bearing (or bushing) seats 36 for the bearings or bushings 16 (see FIG. 2).

A top and side view of the mounting block 20 is shown in FIG. 7, a rear view of the housing block 20 is shown in FIG. 7A, a top view of the housing block 20 is shown in FIG. 7B, and is a cross-sectional view of the housing block 20 is shown in FIG. 7, taken along line 7C-7C of FIG. 7A. The mounting block 20 includes a shaft passage 21 and a shaft retaining annular recess 21a. The retaining ball 14a (see FIG. 2) engages the shaft retaining annular recess 21a to retain the housing 12 on the mounting block 20, while allowing the housing 12 to be detached from the mounting block 20 without tools.

A side view of a charging base (or stand) 40 of the bluetooth audio steering wheel knob 10 is shown in FIG. 8A, a top view of the charging base 40 is shown in FIG. 8B, and a cross-sectional view of the charging base 40, taken along line 8C-8C of FIG. 8A, is shown in FIG. 8C. The charging base 40 includes a shaft passage 44 for accepting the shaft 14 of the bluetooth audio steering wheel knob 10, and matching ports 42 which may be aligned with the bottom ports 34 (see FIG. 3) during charging. The bluetooth audio steering wheel knob 10 includes batteries for powering a bluetooth circuit and the audio transducer 30, and the charging base 40 connects to the bluetooth audio steering wheel knob 10 to charge the batteries. The charging base 40 may electrically connect to a vehicle cigarette lighter, or to a residential AC power outlet.

Figure 10:
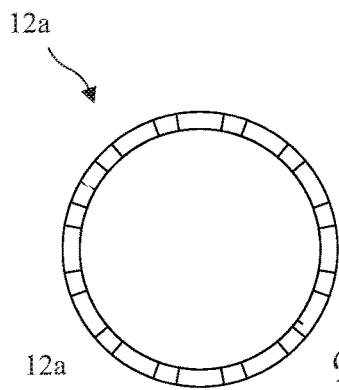
FIG. 10 shows a top cross-sectional view of the housing body of the BLUETOOTH® wireless communication link audio steering wheel knob according to the present invention.
Figure 9:
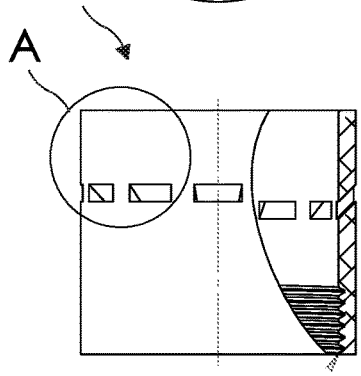
FIG. 9 shows a side view of the housing body of the BLUETOOTH® wireless communication link audio steering wheel knob according to the present invention.
Figure 11:
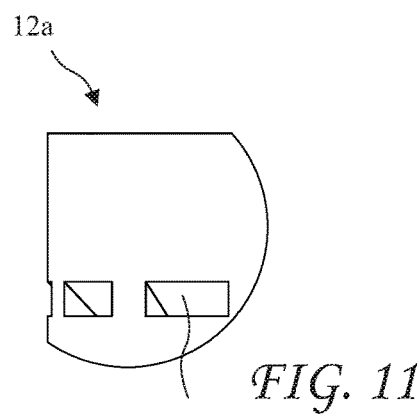
FIG. 11 shows detail A of FIG. 9 of the housing body of the BLUETOOTH® wireless communication link audio steering wheel knob according to the present invention.

A side view of the housing body 12a is shown in FIG. 9, a top cross-sectional view of the housing body 12a is shown in FIG. 10, and a partial side view of the housing body 12a showing detail A of FIG. 9 of the sound port 32 is shown in FIG. 11.

Figure 13:
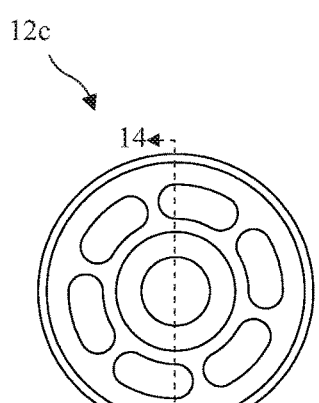
FIG. 13 shows a top view of the housing bottom of the BLUETOOTH® wireless communication link audio steering wheel knob according to the present invention.
Figure 12:
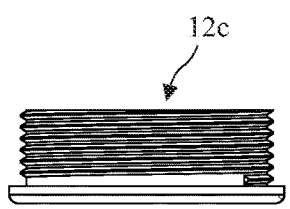
FIG. 12 shows a side view of the housing bottom of the BLUETOOTH® wireless communication link audio steering wheel knob according to the present invention.
Figure 14:
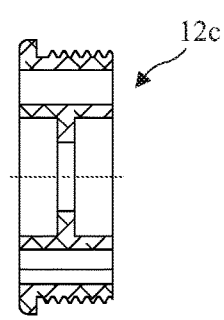
FIG. 14 shows a cross-sectional view of the housing bottom of the BLUETOOTH® wireless communication link audio steering wheel knob according to the present invention taken along line 14-14 of FIG. 13.

A side view of the housing bottom 12c is shown in FIG. 12, a top view of the housing bottom 12c is shown in FIG. 13, and a cross-sectional view of the housing bottom 12c taken along line 14-14 of FIG. 13 is shown in FIG. 14.

A top and side view of the mounting block 20 is shown in FIG. 15, a side view of the mounting block 20 is shown in FIG. 16A, a top view of the mounting block 20 is shown in FIG. 16B, and an end view of the mounting block 20 is shown in FIG. 16C.

A top and side view of the mount plate 24 is shown in FIG. 17, a side view of the mount plate 24 is shown in FIG. 18A, a top view of the mount plate 24 is shown in FIG. 18B, and an end view of the mount plate 24 is shown in FIG. 18C.

A top and side view of a first strap 22a is shown in FIG. 20, a top view of the first strap 22a is shown in FIG. 21A, and a side view of the first strap 22a is shown in FIG. 21B. The first strap 22a is for a small rimmed steering wheel.

A top and side view of a second first strap 22b is shown in FIG. 22, a top view of the second strap 22b is shown in FIG. 23A, and a side view of the second strap 22b is shown in FIG. 23B. The second strap 22b is for a slightly larger rimmed steering wheel than the first strap 22a.

Figures 24, 25A, 25B:
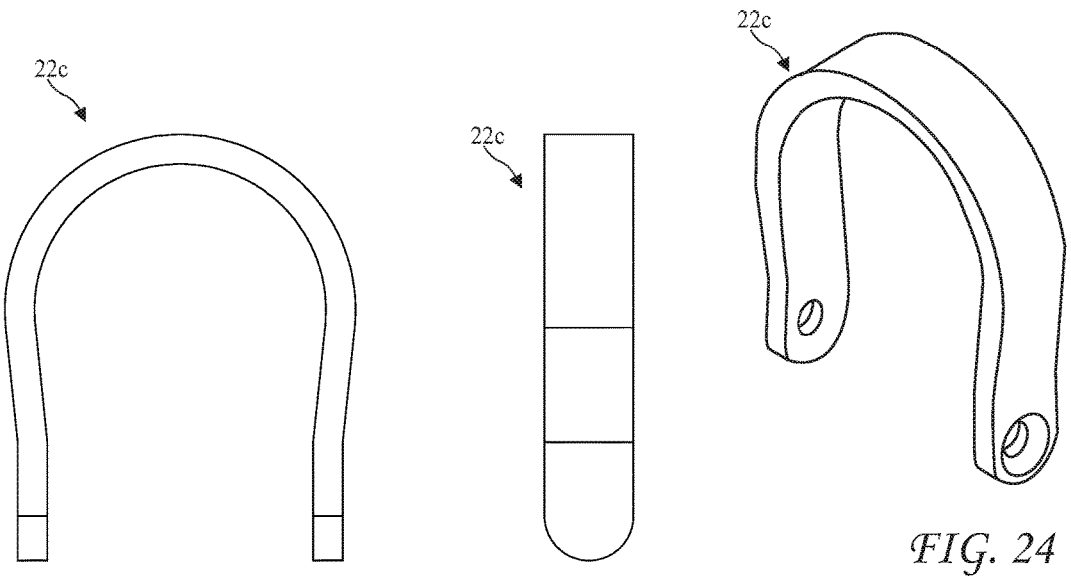
FIG. 24 shows a top and side view of a third strap of the BLUETOOTH® wireless communication link audio steering wheel knob according to the present invention.
FIG. 25A shows an end view of the third strap of the BLUETOOTH® wireless communication link audio steering wheel knob according to the present invention.
FIG. 25B shows a side view of the third strap of the BLUETOOTH® wireless communication link audio steering wheel knob according to the present invention.

A top and side view of a third strap 22c is shown in FIG. 24, a top view of the third strap 22c is shown in FIG. 25A, and a side view of the third strap 22c is shown in FIG. 25B.

The third strap 22c is for a slightly larger rimmed steering wheel than the second strap 22b.

Figures 26, 27A, 27B:
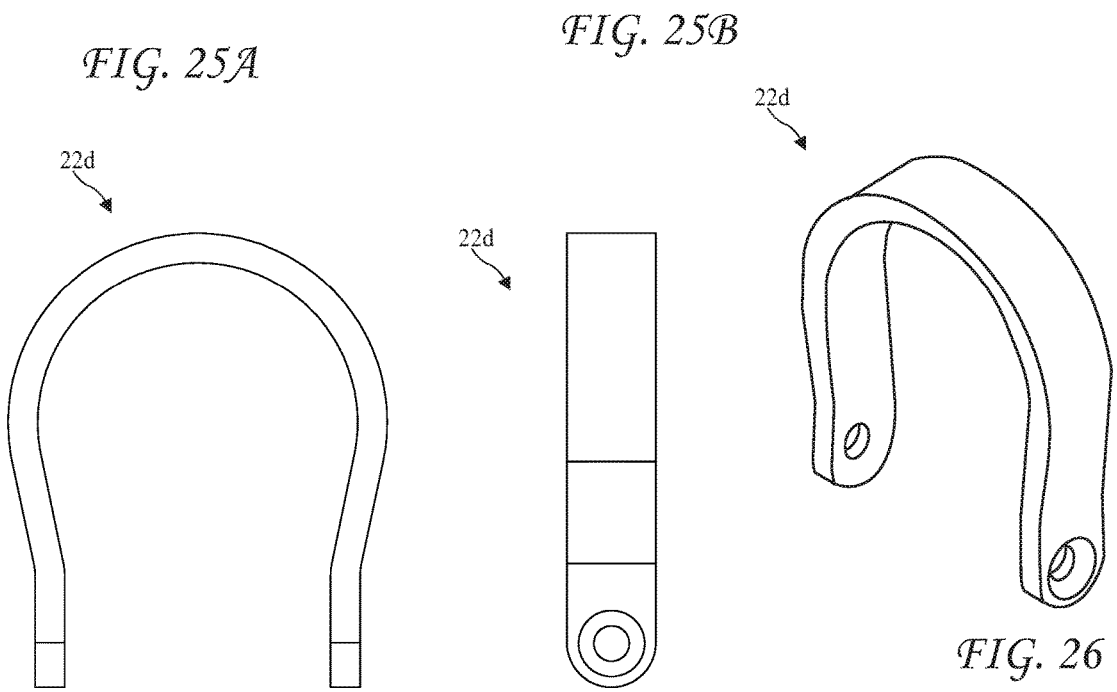
FIG. 26 shows a trop and side view of a fourth strap of the BLUETOOTH® wireless communication link audio steering wheel knob according to the present invention.
FIG. 27A shows an end view of the fourth strap of the BLUETOOTH® wireless communication link audio steering wheel knob according to the present invention.
FIG. 27B shows a side view of the fourth strap of the BLUETOOTH® wireless communication link audio steering wheel knob according to the present invention.

A top and side view of a fourth strap 22d is shown in FIG. 26, a top view of the fourth strap 22d is shown in FIG. 27A, and a side view of the fourth strap 22d is shown in FIG. 27B. The fourth strap 22d is for a large rimmed steering wheel.

Figure 29:
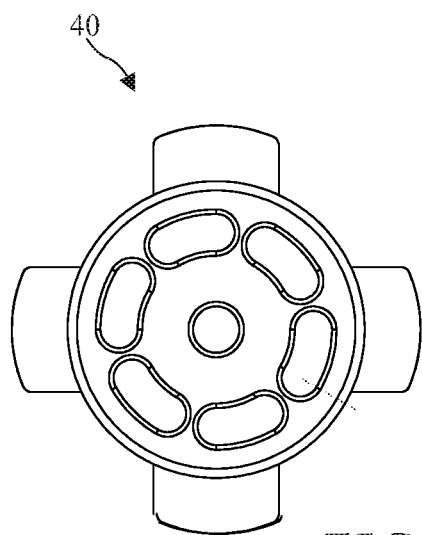
FIG. 29 shows a top view of the charging base of the BLUETOOTH® wireless communication link audio steering wheel knob according to the present invention.
Figure 28:
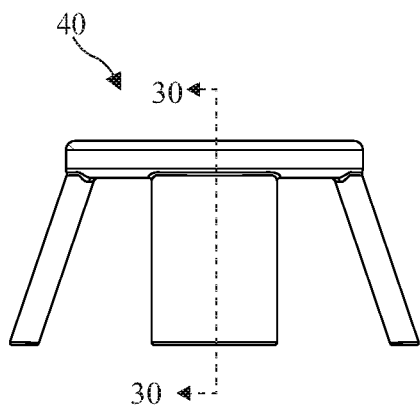
FIG. 28 shows a side view of a charging base of the BLUETOOTH® wireless communication link audio steering wheel knob according to the present invention.
Figure 30:
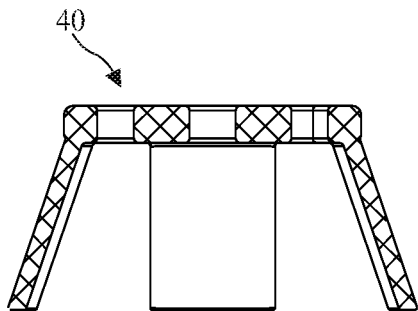
FIG. 30 shows a cross-sectional view of the charging base of the BLUETOOTH® wireless communication link audio steering wheel knob according to the present invention taken along line 30-30 of FIG. 28.

A side view of a charging base 40 is shown in FIG. 28, a top view of the charging base 40 is shown in FIG. 29, and a cross-sectional view of the charging base 40 taken along line 30-30 of FIG. 28 is shown in FIG. 30.

Figure 31B:
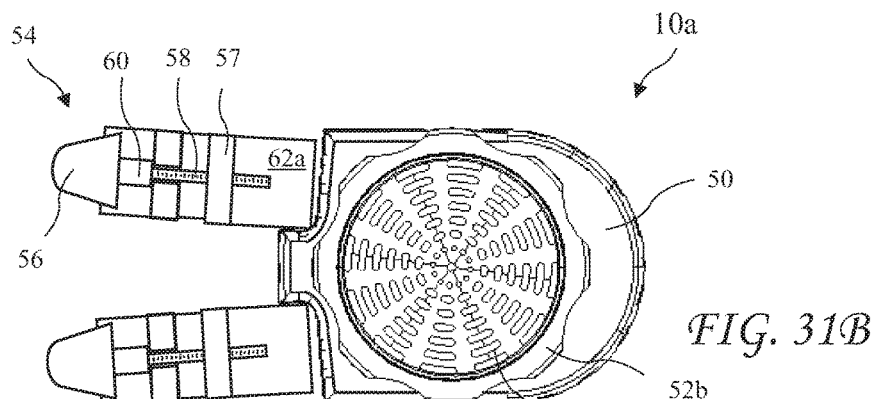
FIG. 31B is a top view of the second BLUETOOTH® wireless communication link audio steering wheel knob according to the present invention.
Figure 31A:
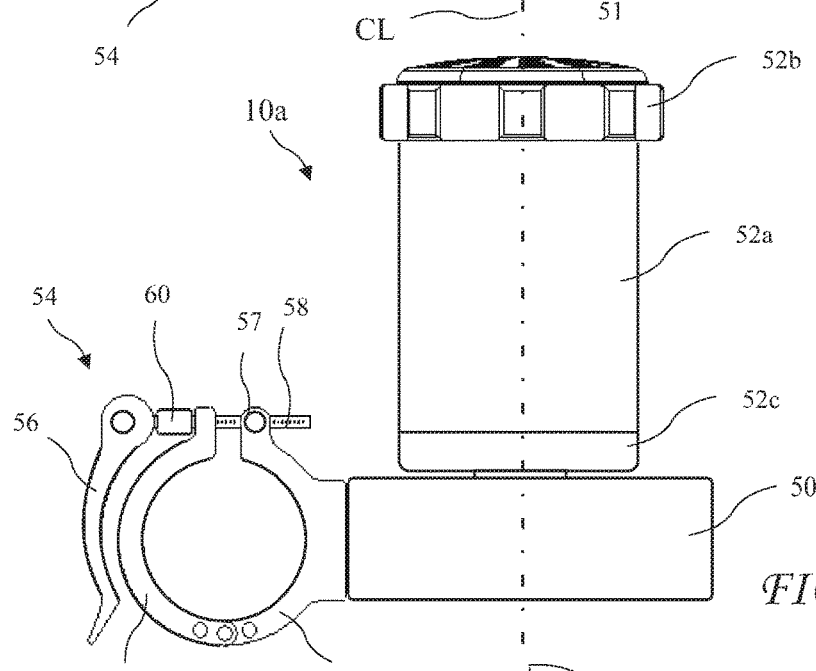
FIG. 31A is a side view of a second BLUETOOTH® wireless communication link audio steering wheel knob according to the present invention.
Figure 31C:
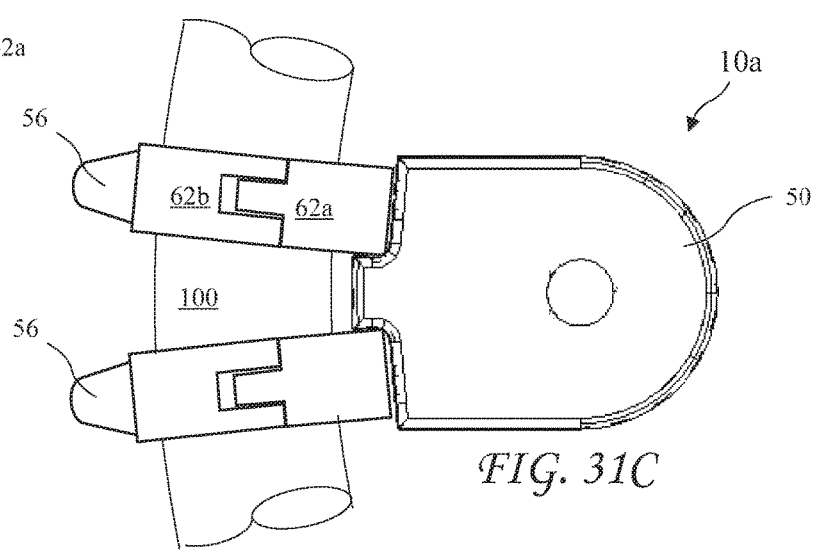
FIG. 31C is a bottom view of the second BLUETOOTH® wireless communication link audio steering wheel knob according to the present invention.

A second embodiment of the audio steering wheel knob 10a having a centerline CL is shown in a side view in FIG. 31A, in a top view in FIG. 31B, and in a bottom view in FIG. 31C. The audio steering wheel knob 10a includes a solid wall housing center 52a, a sound vented housing top 52b, and a housing base 52c. The housing top 52b includes sound vents 51. Advantageously, the sound vents 51 are near the driver, and directed towards the driver, to allow reduced volume, increasing battery life. The housing base 50 is attached to a steering wheel hoop 100.

A clamp assembly 54 is provided to attach the bluetooth audio steering wheel knob 10a to a vehicle steering wheel (not shown). The clamp assembly 54 includes a fixed half 62a and a moving half 62b.

A side view of the second audio steering wheel knob 10a with the clamp lever closed is shown in FIG. 32A and a side view of the second audio steering wheel knob 10a with the clamp lever 56 opened is shown in FIG. 32B. The clamp assembly 54 is closed to grasp the steering wheel by adjusting and then closing the clamp lever 56. The clamp lever 56 is adjusted by turning the clamp lever 56 to rotate the lever screw 58 into the lever drum 57, and rotating the clamp lever 56 along arc A1 presses an increasing radius surface 59 against the rubber grommet 60 to compress the rubber grommet 60 against the moving half 62b to draw the moving half 62b along arc A2 towards the fixed half 62a. The clamp assembly 54 is loosened by rotating the lever 56 along arc A1' to move the moving half along arc A2'.

A bottom and side view of the housing lid 52b of the second audio steering wheel knob 10a is shown in FIG. 33, a side view of the housing lid 52b is shown in FIG. 34A, and a top view of the housing lid 52b is shown in FIG. 43B. The housing lid 52b includes the sound ports 51 facing the driver. The audio transducer 30 resides generally parallel with the centerline CL and produces sound waves 81 radiating generally parallel with the centerline CL.

Figure 36B:
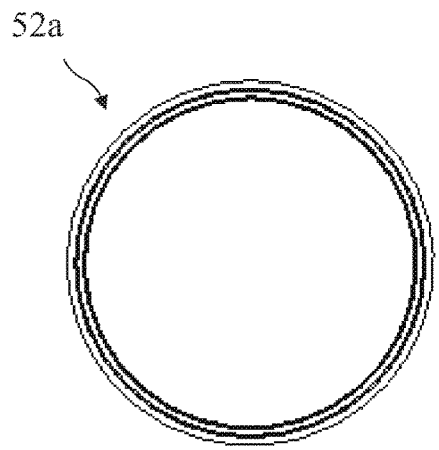
FIG. 36B is a top view of the housing center of the second BLUETOOTH® wireless communication link audio steering wheel knob according to the present invention.
Figure 36A:
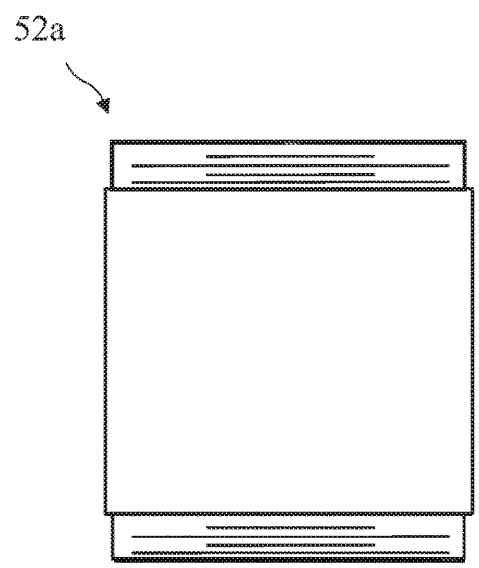
FIG. 36A is a side view of the housing center of the second BLUETOOTH® wireless communication link audio steering wheel knob according to the present invention.
Figure 35:
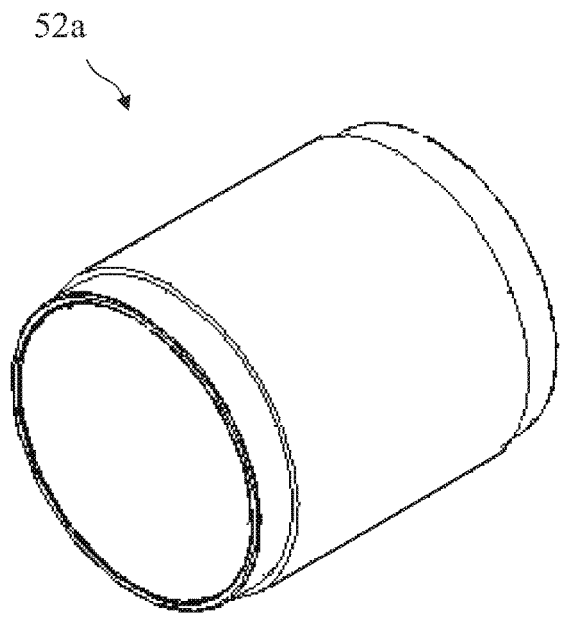
FIG. 35 is a bottom and side view of a housing center of the second BLUETOOTH® wireless communication link audio steering wheel knob according to the present invention.

A bottom and side view of a housing center 52a of the second bluetooth audio steering wheel knob 10a is shown in FIG. 35, a side view of the housing center 52a is shown in FIG. 36A, and a top view of the housing center 52a is shown in FIG. 36B. The housing center 52a has solid walls with no sound ports, and male threads at opposite ends for attaching the top 52b and the base 52c.

A bottom and side view of a housing base 52c of the second bluetooth audio steering wheel knob 10a is shown in FIG. 37, a side view of the housing base 52c is shown in FIG. 38A, and a top view of the housing base 52c is shown in FIG. 38b. The housing base 52c includes a housing stud 68 for attaching to the mount block 50.

A cutaway side view of the housing base 52c retained on the mounting block 50 of the second audio steering wheel knob 10a is shown in FIG. 39 and a cross-sectional view of the mounting block 50 taken along line 40-40 of FIG. 39 is shown in FIG. 40. The mounting block 50 includes a stepped passage 63 and a stepped lock 64 urged against a step 65 in the stepped passage 63 to retain the housing stud 68 in the stud passage 72 in the housing 52 on the housing base 50.

An end 64a of the stepped lock 64 extends from the housing base 50, and depressing the end 64a against spring 66 separates the step 65 from recess 70 and releases the housing 52 from the housing base 50.

The bluetooth audio steering wheel knob 10a is otherwise similar to the audio steering wheel knob 10 described in FIGS. 1-30.

A circuit for the audio steering wheel knobs 10 and 10a is shown in FIG. 41. The circuit includes at least one audio transducer 30 producing and receiving sound waves 81, a bluetooth circuit 82, and batteries 84 residing in the housings 12 and 52, and a charging port 86 on the exterior of the housings 12 and 52. The batteries 84 provide a power signal through leads 85 to the bluetooth circuit 82 and are recharged through the bluetooth circuit 82 by power provided through leads 87 from the charging port 86. The bluetooth circuit 82 provides signal 83 through leads 83 to drive the at least one audio transducer 30 and receive signals from the at least one audio transducer 30 associated with sound waves 81.

A bluetooth device 88 communicates with the bluetooth circuit 82 via bluetooth signals 90. The bluetooth device 88 may be an audio content (for example, music) device, a smart phone, a lap top computer, a notebook computer, a CB radio including bluetooth capability, or any bluetooth equipped device capable of sending or receiving audio content.

A second circuit is shown in FIG. 42. The second circuit replaces the port 86 with electrical connections in the stud 68 (see FIG. 37) which is electrically connect to a electrical source 92 in the stand 40 for charging the batteries 84.

A third circuit is shown in FIG. 43. The third circuit includes coils 94 and 96 for inductively charging the batteries 84.

The housings 12, 52, mounting blocks 20, 50, clamp assembly 54, and straps 22 are preferably made from aluminum, but may be a suitably strong plastic material.

While the invention herein disclosed has been described by means of specific embodiments and applications thereof, numerous modifications and variations could be made thereto by those skilled in the art without departing from the scope of the invention set forth in the claims.

I claim:

1. An audio steering wheel knob, comprising:
   a mounting block configured to attach to a steering wheel hoop;
   a housing attachable to the mounting block positioning a housing centerline (CL) of the housing generally perpendicular to the steering wheel hoop, the housing including:
      a housing base of the housing residing proximal the mounting block;
      at least one audio transducer residing in the housing facing away from the housing base and along the centerline;
      a housing top opposite to the housing base, the housing top including openings providing acoustic communication between the audio transducer and a driver through the housing top;
      a wireless circuit for receiving wireless signals and providing electrical signals to the at least one audio transducer; and
      a battery providing power to the at least one audio transducer and the wireless circuit; and
   the housing attachable to and detachable from the mounting block, wherein the housing rotates about the centerline (CL) freely with respect to the mounting block.

2. The audio steering wheel knob of claim 1, wherein:
the housing includes a stud extending out from a housing base of the housing; and
the mounting block includes a stud passage for attachment of the housing.

3. The audio steering wheel knob of claim 2, wherein:
the stud includes an annular recess; and
a lock in the mounting block engages the annular recess to retain the housing on the mounting block.

4. The audio steering wheel knob of claim 3, wherein:
the mounting block includes a stepped passage;
the lock is a stepped lock sliding in the stepped passage;
a lock spring biases the stepped lock against a step in the stepped passage; and
while residing against the step, the stepped block engages the annular recess of the stud to retain the housing on the mounting block.

5. The audio steering wheel knob of claim 1, wherein the housing is attachable to and detachable from the mounting block without using tools.

6. The audio steering wheel knob of claim 1, wherein the mounting block is attachable to and detachable from the steering wheel by a clamp assembly comprising:
an arced fixed half fixedly attached to the mounting block;
an arced moving half pivotally attached at a pivoting end to the arced fixed half and having a free end of the arced moving half opposite to the pivoting end;
a lever connecting the free end of the arced moving half to the arced fixed half, the lever configured to draw the free end of the arced moving half towards the arced fixed half, to grasp the steering wheel between the arced fixed half and the arced moving half.

7. The audio steering wheel knob of claim 6, wherein the wireless circuit is a BLUETOOTH® wireless communication link circuit.

8. The audio steering wheel knob of claim 6, wherein the BLUETOOTH® wireless communication link circuit is configured to receive and send BLUETOOTH® wireless communication link signals from a BLUETOOTH® wireless communication link equipped device capable of sending or receiving audio content.

9. The audio steering wheel knob of claim 8, wherein the BLUETOOTH® wireless communication link equipped device is selected from the group consisting of an audio content device, a smart phone, a lap top computer, a notebook computer, and a Citizens Band (CB) radio including BLUETOOTH® wireless communication link capability.

10. The audio steering wheel knob of claim 1, wherein the at least one audio transducer is an audio signal transmitting transducer and an audio signal receiving transducer.

11. The audio steering wheel knob of claim 1, wherein the at least one audio transducer is a single audio signal transmitting and receiving transducer.

12. The audio steering wheel knob of claim 1, wherein the audio transducer faces the driver.

13. The audio steering wheel knob of claim 1, wherein the housing centerline (CL) is pointed towards the driver.

14. The audio steering wheel knob of claim 1, wherein the housing is generally cylindrical and the centerline (CL) is an axis of the housing.

15. The audio steering wheel knob of claim 1, wherein the openings in the housing top are opposite to the housing base.

16. The audio steering wheel knob of claim 1, wherein the openings in the housing top are between the audio transducer and the driver.

17. An audio steering wheel knob, comprising:
a mounting block configured to attach to a steering wheel hoop;
a housing attachable to the mounting block positioning a housing centerline (CL) of the housing generally perpendicular to the steering wheel hoop, the housing including:
  a housing base of the housing residing proximal the mounting block;
  at least one audio transducer residing in the housing and configured to face a driver;
  a housing top opposite to the housing base and facing the driver, the housing top including openings between the audio transducer and the driver providing acoustic communication between the audio transducer and the driver through the housing top;
  a BLUETOOTH® wireless communication link circuit for receiving wireless signals and providing electrical signals to the at least one audio transducer; and
  a battery providing power to the at least one audio transducer and the BLUETOOTH® wireless communication link; and
the housing attachable and detachable from the mounting block without tools,
wherein the housing rotates freely about the centerline (CL) with respect to the mounting block.

18. An audio steering wheel knob, comprising:
a mounting block configured to attach to a steering wheel hoop;
a housing attachable to the mounting block positioning a housing centerline (CL) of the housing generally perpendicular to the steering wheel hoop, the housing including:
  a housing base of the housing residing proximal the mounting block;
  at least one audio transducer residing in the housing facing a driver;
  a housing top opposite to the housing base, the housing top including openings between the audio transducer and the driver providing acoustic communication between the audio transducer and the driver through the housing top;
  a BLUETOOTH® wireless communication link circuit for receiving wireless signals and providing electrical signals to the at least one audio transducer;
  a battery providing power to the at least one audio transducer and the BLUETOOTH® wireless communication link; and
  a stud extending out from a housing base of the housing, the stud including an annular recess;
the mounting block configured to attach to a steering wheel and detach from the steering wheel without tools, and including a stud passage for receiving the stud, the housing attachable and detachable from the mounting block without tools by a lock comprising:
  a stepped passage in the mounting block;
  a stepped lock sliding in the stepped passage;
  a lock spring biases the stepped lock against a step in the stepped passage; and
  while residing against the step, the stepped block engages the annular recess of the stud to retain the housing on the mounting block; and
wherein the housing rotates freely with respect to the mounting block.

* * * * *